United States Patent [19]

Parks

[11] 4,453,192
[45] Jun. 5, 1984

[54] PROTECTIVE DEVICE FOR THREE PHASE INDUCTANCES

[75] Inventor: James O. Parks, St. Louis, Mo.

[73] Assignee: ACF Industries, Incorporated, New York, N.Y.

[21] Appl. No.: 238,512

[22] Filed: Feb. 26, 1981

[51] Int. Cl.$^3$ .............................................. H02H 3/24
[52] U.S. Cl. ......................................... 361/92; 361/100
[58] Field of Search ...................... 361/85, 92, 90, 100, 361/33

[56] References Cited

U.S. PATENT DOCUMENTS

| | | | |
|---|---|---|---|
| 2,759,177 | 8/1956 | Hightower | 361/92 X |
| 4,027,204 | 5/1977 | Norbeck | 361/92 X |
| 4,065,804 | 12/1977 | Rostad | 361/100 X |
| 4,156,885 | 5/1979 | Baker et al. | 361/92 X |
| 4,238,811 | 12/1980 | Fry | 361/92 |

Primary Examiner—Reinhard J. Eisenzopf
Attorney, Agent, or Firm—J. Joseph Muller; Henry W. Cummings

[57] ABSTRACT

In accordance with the present invention a three phase voltage sensor senses the presence of all three phases of the voltage to be applied to a three phase inductance. If all three phases are present, a gate member such as a triac or quadrac remains in the closed positon permitting the voltage to be applied to the three phase inductance. If all three phases are not present, the gate member moves to the open circuit position preventing application of the voltage to the three phase inductance until all phases are supplying voltage. The preferred three phase voltage sensor is at least one optical isolator which senses the presence of all phases in the power supply. Preferably a pair of optical isolators are used in parallel with the voltage across any two of the phases being applied to one of the optical isolators. Preferably the optical isolator contains a photo-resistive material which has low resistance in the presence of light, and a lamp. If all three phases are present, the lamp lights, and lowers the resistance of the photo-resistive material. The gate member remains in the closed circuit position to apply all three phases to the three phase inductance. However, if the input voltage is not applied to one or more phases of the three phase voltage input, the lamp does not turn on and the resistance of the photo-resistive material remains very high. In this event the gate member moves to the open circuit position and no voltage is applied to any of the phases of the inductance.

23 Claims, 3 Drawing Figures

4,453,192

PROTECTIVE DEVICE FOR THREE PHASE INDUCTANCES

FIELD OF THE INVENTION

This invention relates to a protective circuit for use in protecting three phase inductances. It is applicable to protecting three phase inductance motors and electrical heaters.

BACKGROUND OF THE INVENTION

It frequently happens that a cord is cut or a fuse is blown, cutting off one phase of the power supply to a three phase motor. When this occurs, one portion of the stator inductance windings is shorted out. The load on the remaining two stator inductance portions is too high and the phase relationship is lost. Thus the stator windings quickly burn up and the motor no longer functions.

This results in an expense to repair the motor and down time of the motor and labor to remove and reinstall the repaired motor.

It is believed similar problems exist with respect to other three phase inductances such as three phase inductance heaters.

SUMMARY OF THE INVENTION

In accordance with the present invention a three phase voltage sensor senses the presence of all three phases of the voltage to be applied to a three phase inductance. If all three phases are present, a gate means remains in the closed position permitting the voltage to be applied to the three phase inductance. If all three phases are not present, the gate means moves to an open circuit position preventing application of the voltage to the remaining phases of the three phase inductance. The preferred gate means is a triac or quadrac. The preferred three phase voltage sensor is at least one optical isolator which senses the presence of all phases in the power supply. Preferably a pair of optical isolators are used in parallel with the voltage across any two of the phases being applied to one of the optical isolators. Preferably the optical isolator contains a photo-resistive material which has low resistance in the presence of light, and a lamp. If all three phases are present, the lamp lights and lowers the resistance of the photo-resistive material. The gate means then remains in the closed circuit position to apply all three phases to the three phase inductance. However if the input voltage is not applied to one or more phases of the three phase voltage input, the lamp does not turn on and the resistance of the photo-resistive material remains very high. In this event, the gate means moves to the open circuit position and no voltage is applied to any of the phases of the inductance until all three phases are again present in the power supply. An optical coupler comprising a light emitting diode and a triac may also be used.

For most applications, the input voltage must be lowered to a level to be received by the optical isolator. Preferably to lower the three phase voltages the voltages are first rectified to D.C., for example with a bridge rectifier. The rectified D.C. voltage is preferably reduced with a zener diode and one or more resistors. Each phase of the thus reduced D.C. voltages is then applied to at least one optical isolator to sense voltage in that particular phase. The three phase power supply voltages may be lowered in other ways, such as with an A.C. transformer, or with an A.C. transformer and D.C. rectifier and a solid state voltage regulator.

IN THE DRAWINGS

DESCRIPTION OF PREFERRED EMBODIMENTS

Figure 1:
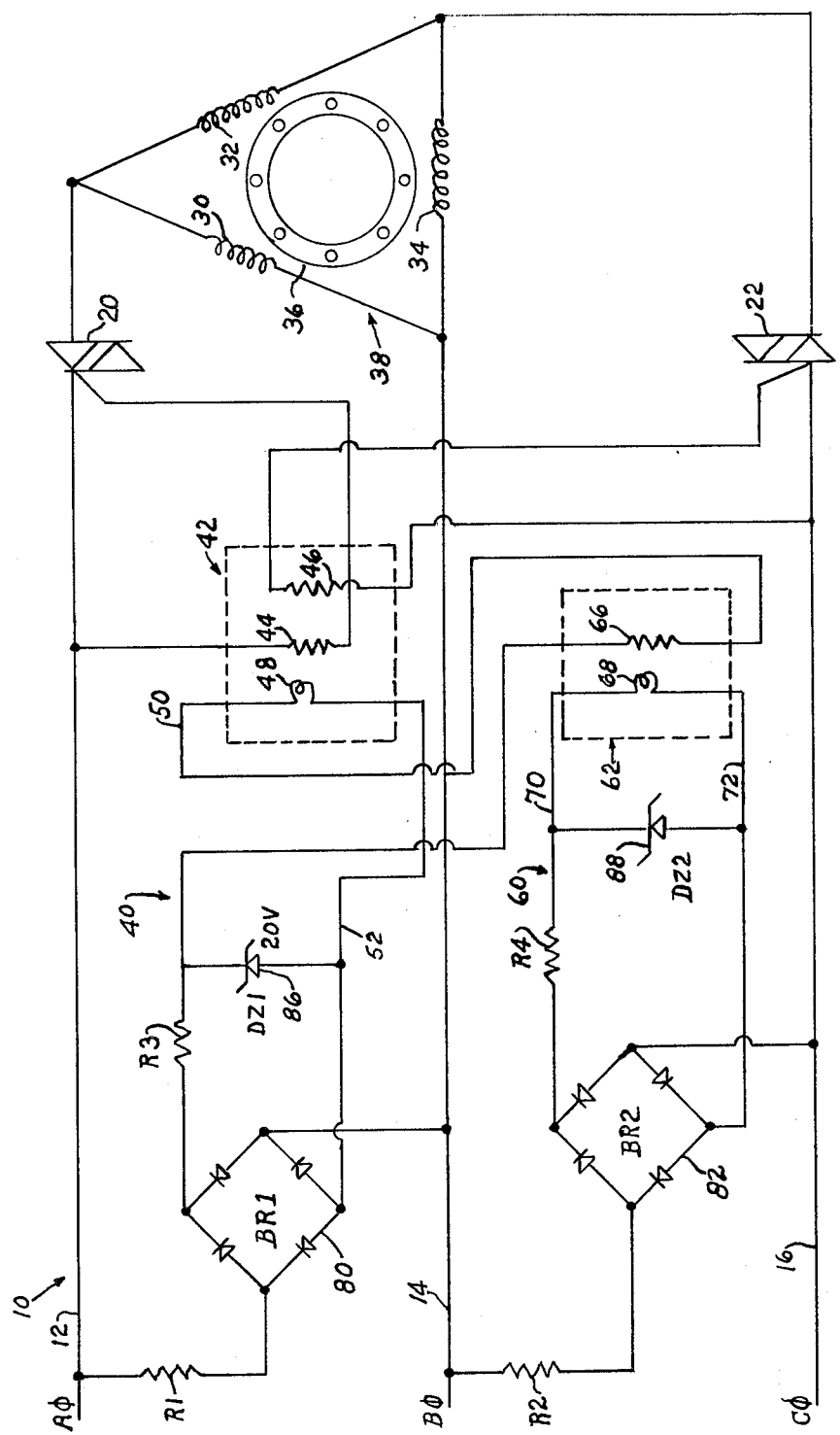
FIG. 1 is an electrical schematic diagram of the protective circuit of the present invention.

The three phase protector circuit is indicated in the drawings generally at 10 and includes three lines 12,14 and 16 of a three phase power supply. As an example, the power supply will be illustrated as being 250 volts. However it is believed that the present invention is applicable to power supplies of 110 volts up to thousands of volts. A gate means is provided as indicated at 20 and 22 to allow or prevent the voltage to be applied to inductance coils 30,32 and 34 of a stator 36 for an electric motor 38. A preferred gate means is a triac or a quadrac. As an example, a triac manufactured by Texas Instruments Company, under part number 2N6421M may be utilized. Similar devices are available from Motorola and RCA under the same part number. Many other triacs will also function satisfactorily for this use.

The devices 20 and 22 are respectively activated by voltage sensors indicated generally at 40 and 60. While any suitable voltage sensor may be utilized which senses the presence of the voltage in all three phases of power in lines 12,14 and 16, a particularly suitable voltage sensor includes optical isolators respectively indicated 42 and 62. The optical isolator 42, as is well known in the art, contains a light sensitive resistor. In the presence of light, the photo-sensitive resistor has a very small resistance. However, in the absence of light the resistance is very high. Such photo-sensitive resistances are indicated in the drawings 44,46 and 66. Commercially available optical isolators also include a suitable lamp such as lamps 48 and 68 in isolators 42 and 62 respectively. When a voltage is applied to electric isolator 42 via lines 50 and 52 which are connected between two of the three phase power lines, for example, lines 12 and 14, the current flowing therethrough causes lamp 48 to light and the resistance in photo-resistive elements 44 and 46 to reduce to a low level. Resistors 44 and 46 are in the respective gate input circuits of triacs 20 and 22. With the resistance valve of these resistors at their reduced level, the current flowing through the gate circuits is sufficient to bring the triacs into conduction so voltages applied on lines 12,14 and 16 are supplied to the coils of motor 38. It will be noted that resistive elements 44 and 46 are both contained in optical isolator 42 so illumination of lamp 48 simultaneously lowers the resistance value of both.

To insure the presence of the applied voltage across lines 14 and 16, photo-resistive element 66 of optical isolator 62 is connected in series with lamp 48 of optical isolator 42. Current flowing through lines 70 and 72, which are connected between power lines 14 and 16, is applied to lamp 68 of optical isolator 62 to illuminate the lamp. This, in turn, reduces the resistance of photo-resistive element 66. As noted, photo-resistive element 66 is placed in series with lamp 48 of optical isolator 42. Thus, optical isolator 62 is in series with optical isolator 42. By placing isolator 62 in series with isolator 42, sufficient current to illuminate lamp 48 will only be present if voltage is present across lines 14 and 16. Otherwise, lamp 68 will not be illuminated and the resistance of photo-resistive element 66 will be high enough to keep the current flowing through lines 50 and 52 too low to illuminate lamp 48. Thus, photo-resistive elements 44 and 46 will have high resistances and triacs 20 and 22 cannot be brought into conduction. An example of a suitable optical isolator 42 is a Sigma Data Cell 30IR2-12. An example of a suitable optical isolator 62 is Sigma Data Cell 30IR1-12.

Optical isolators 42 and 62 operate on low voltage. Circuit means are provided to reduce the high level A.C. voltage means across lines 12,14 and 16 to, for example, 12 volts. This is conveniently done by first rectifying the A.C. voltage using a pair of bridge rectifiers 80 and 82 placed across lines 12,14 and 16. In addition, a resistor R1 is connected between line 12 and one input of rectifier bridge 80 while a resistor R2 is connected between line 14 and one input of rectifier bridge 82. In one example, resistors R1 and R2 are rated at 18,000 ohms. In addition, rectifier bridges 80 and 82 are designed for 600 volts and 0.5 amps.

A zener diode 86 is connected across the output of rectifier bridge 80 and a zener diode 88 is connected across the output of rectifier bridge 82. Zener diodes 86 and 88 are conveniently rated at 20 volts, 1–1½ watt. However, 7 volt to 20 volt zener diodes are suitable. Thus, zener diodes of the type 1N4037-1N4749 are suitable for use in voltage sensor circuits 40 and 60. A current limiting resistor R3 is connected between one output of rectifier bridge 80 and the cathode of zener diode 86, while a similar resistor R4 is connected between one output of rectifier bridge 82 and the cathode of zener diode 88. Resistors R3 and R4 are typically in the range of 1500 to 2000 ohms. Thus the voltage across lines 12,14 and 16 has been converted from 250 volts A.C. to between 7 and 20 volts rectified A.C. depending upon the voltage choice for the zener diodes 86 and 88. The optical isolators 42 and 62 tolerate this voltage level without difficulty.

The operation of the invention is as follows. If line 12 is cut or a fuse blows, lamp 48 sees no current. Thus, the resistance of photo-resistive elements 44 and 46 is very high. There is thus insufficient current to activate triacs 20 and 22. These devices assume an open circuit non-conductive condition and no voltage is applied to stator 36 of electric motor 38. If line 14 is cut or a fuse blows in this line, no current flows through lines 50 and 52 or through lines 70 and 72. Thus neither lamp 48 or 68 is lit and a very high resistance exists in elements 44,46 and 66. Again, there is insufficient current to activate triacs 20 and 22, and no voltage is applied to stator 36 of motor 38. If line 16 is cut or a fuse blows, no current flows through lines 70 and 72 and lamp 68 is not lit. Therefore, the resistance of element 66 is very high. Since resistor 66 is in series with isolator 42, the high resistance in resistor 66 prevents illumination of lamp 48 because of insufficient current. Thus a high resistance occurs in elements 44 and 46 and insufficient current exists to activate triacs 20 and 22. Again, an open circuit exists and no current flows to stator 36 of the motor 38.

It should be emphasized however that other arrangements for reducing the applied voltage about the lines 12,14 and 16 could be utilized. For example, as shown in FIG. 2, an A.C. transformer may be used to reduce the voltage in lines 150 and 152 and 170 and 172 to a voltage low enough for operation of the optical isolators.

In this embodiment, a pair of A.C. transformers 100 and 102 are connected in parallel across phase lines 12, 14 and 16. These A.C. transformers reduce the A.C. voltage for example from 250 volts to 12.5 volts and a current of about 0.5 amps. The secondary 101 from transformer 100 is connected through lines 150 and 152 to an optical isolator 142 of the type described in FIG. 1 and including photo-resistive elements 144 and 146 and a lamp 148. Similarly, from the secondary 103 of transformer 102, lines 170 and 172 are connected to an optical isolator 162 including a lamp 168 and a photo-resistive element 146 of isolator 160 is connected in line 150 in series with lamp 148 of optical isolator 142 as was the case with FIG. 1. FIG. 2 also illustrates the connection of light sensitive elements 144 and 146 in the respective gate circuits of triacs 120 and 122. Optical isolator 142 may be a Sigma Data Cell 301R2-12. Isolator 160 may be a Sigma Data Cell 301R1-12. Triacs 120 and 122 may be the same commercially available units as FIG. 1.

Figure 2:
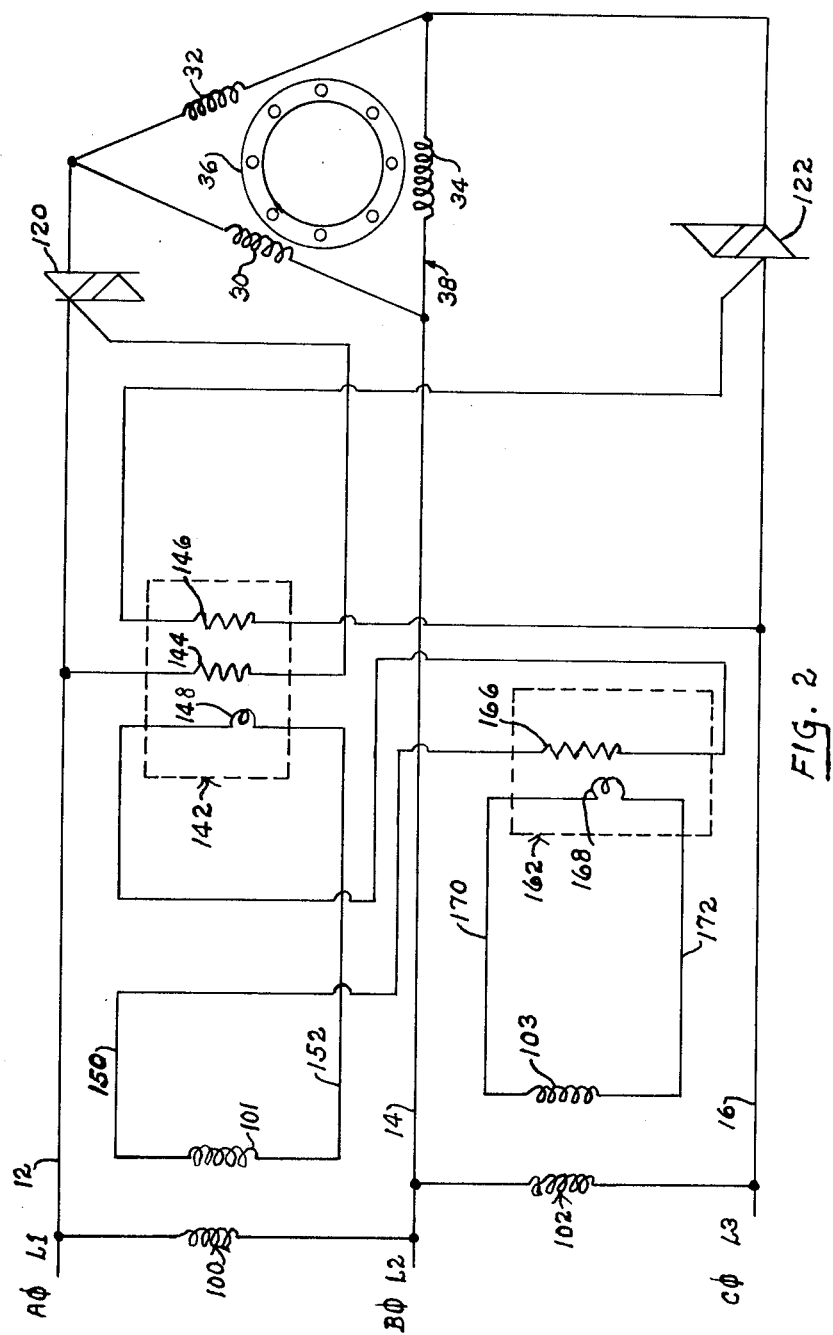
FIG. 2 is an electrical schematic diagram including an A.C. transformer to lower the power supply voltage prior to the optical isolator.

It is seen that FIG. 2 illustrates a satisfactory voltage reduction by means of an A.C. transformer for use with triacs 120 and 122. The operation of the circuitry is similar to that described with respect to FIG. 1 except optical isolators 142 and 160 receive regular A.C. current instead of rectified A.C. current. The operation is otherwise the same. There is a question of the availability of A.C. step-down transformers having primary windings across which more than 250 volts is developed, and which reduces the voltage sufficiently low to operate with optical isolators 142 and 160. One could, however, use a series of step-down transformers to successively reduce the voltage from line voltage to a voltage compatible with the requirements of the optical isolators. The circuit, however, is simpler than the embodiment shown in FIG. 1. A.C. transformers are somewhat bulkier than the bridge rectifiers and zeners in FIG. 1, while the cost is estimated to be about the same.

Figure 3:
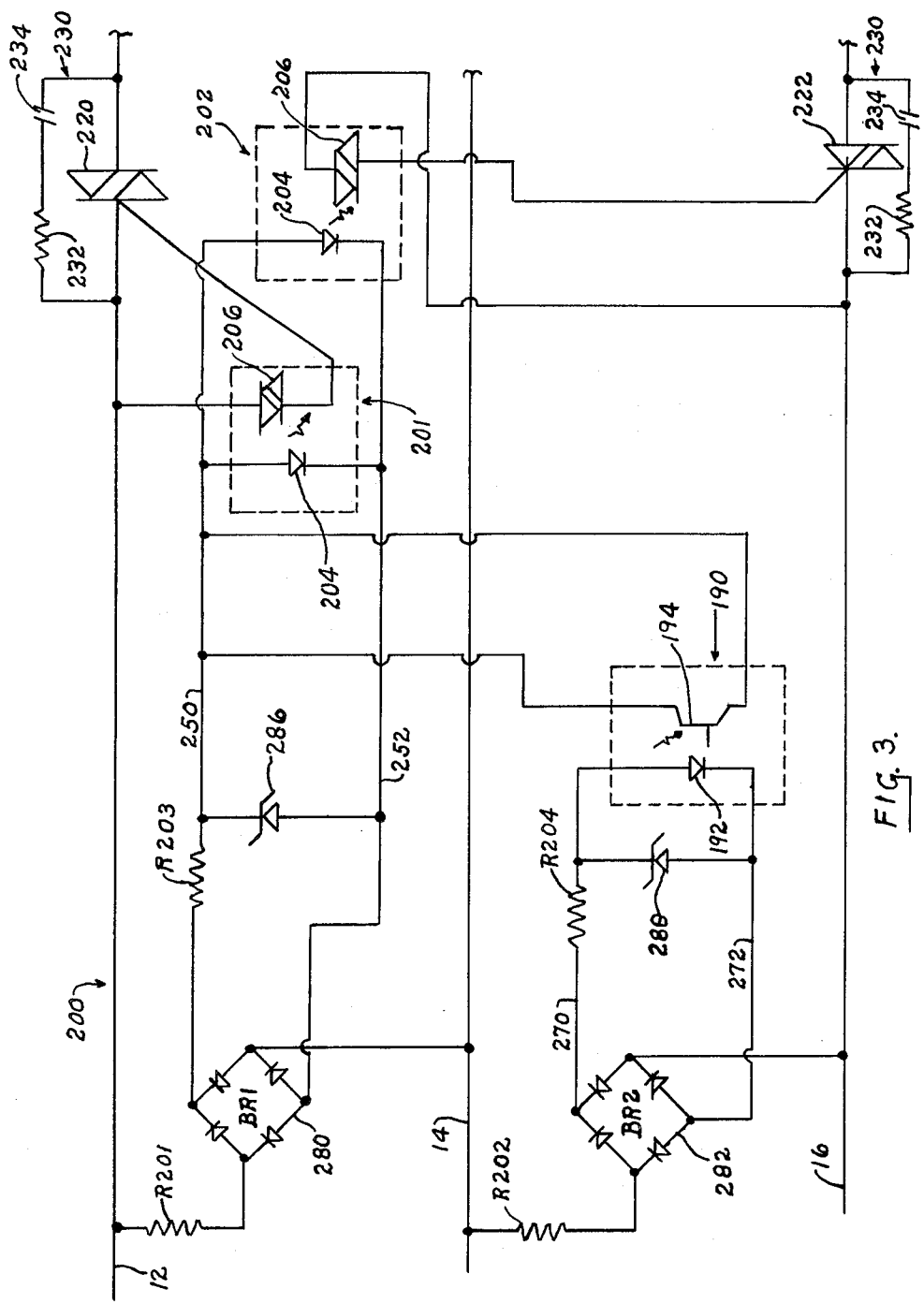
FIG. 3 is an electrical schematic diagram including a rectifier and solid state regulator to lower the voltage prior to connection, and a different optional coupler.

Another embodiment of the present invention is illustrated in FIG. 3. In this embodiment the circuit 200 includes the three phase line voltages 12,14 and 16 described in FIG. 1. Bridge rectifiers 280 and 282 similar to bridge rectifiers 80 and 82 utilized in FIG. 1 are also provided. Resistors R201, R202, R203 and, R204 are also provided with similar values to the resistors R1–R4 shown in FIG. 1. Zener diodes 286 and 288 are also provided. These zener diodes are rated for 10 volts rather than the 20 volts for the diodes 86 and 88 shown in FIG. 1. Leads 270 and 272 across zener diodes 288 extend to an optical coupler 190. This optical coupler includes a light emitting diode 192 and a photo-transistor 194. A suitable coupler is TDI MOC 5006. Photo-transistor 194 of optical coupler 190 is connected in a line 250 extending from zener 286. A pair of optical couplers 201 and 202 are wired in parallel and are connected in the gate circuits of respective triacs 220 and 222. Each optical coupler includes a light emitting diode 204 and a triac driver 206. These optical couplers may comprise two MOC3011 triac driver units wired in parallel.

It is possible that this arrangement may result in noise spikes causing the triac drivers 206 to inadvertently turn on triac 220 or triac 222. The problem can be solved by providing a noise suppression circuit indicated generally at 230 including a suitable resistor 232 and a capacitor 234. As illustrated, these protective circuits are connected in parallel with the triacs 220 and 222.

It will be apparent that the principle of operation of circuit 200 is the same as for circuit 10 shown in FIG. 1. The light emitting diode and transistor sense the presence of the voltage across phase lines 14 and 16. It is thus apparent that a wide variety of solid state voltage sensing means across the three phases may be utilized to sense the presence of the voltage in each of the phases. The optical couplers 201 and 202 sense the voltage across phase lines 12 and 14, and 16 and 12. If the voltage is present in each phase, the voltage is applied to the windings in the motor through triacs 220 and 222. If the voltage is not present in one of the phases, the voltage is not applied to any of the phases of the motor. Thus protection for a three phase inductance is achieved.

It will be apparent that the protective circuit of the present invention has a wide variety of uses. As an example, in plant operation, motors of grinders and reamers burn out because of a failure in one of the three phase lines. One expense item is sending out such motors to replace the stator windings. Down time of the grinder and reamer is another expense. Labor for removal and installation of the stator is yet another expense. Grinders and reamers are merely examples of a wide variety of three phase motors which experience this problem.

It is believed that the voltage sensors and the gate means of the present invention may also function to protect a three phase electrical heater or other three phase inductances which are subject to failure of one of the input voltage lines.

It will also be apparent that most circuit elements of the present invention are commercially available shelf items.

Concerning the voltage reduction, bridge rectifiers and zener diodes are readily available commercial items at relatively low cost. Thus a convenient and inexpensive circuit for reducing the voltage can be obtained with the use of these elements. As mentioned above, A.C. transformers may be utilized to reduce the voltage as such are available for the voltage sensor or optical isolator. At this writing, such A.C. transformers appear to be less readily available than the bridge rectifiers and zener diodes particularly for higher voltages.

What is claimed is:

1. A protective circuit for three phase inductances comprising: voltage reduction means including at least one zener diode; voltage sensor means which senses the presence of all three phases of a voltage to be applied to a three phase inductance connected to said voltage reduction means; circuit means connecting said voltage sensor means to gate means which if all three phases are present remains in a first position permitting the voltage to be applied to a three phase inductance; and if all three phases are not present, said gate means moves to an open circuit position preventing application of the voltage to the three phase inductance.

2. A protective circuit according to claim 1, wherein the three phase voltage sensor comprises at least one optical isolator.

3. A protective circuit according to claim 1, wherein said gate means is selected from a triac and/or a quadrac.

4. A protective circuit according to claim 2, wherein said three phase sensor includes a pair of optical isolators.

5. A protective circuit according to claim 4, wherein each optical isolator comprises light sensitive photoresistive material and a lamp.

6. A protective circuit according to claim 4, wherein said pair of optical isolators are used in parallel with the voltage across any two of the phases being applied to one of the optical isolators.

7. A protective circuit according to claim 2, wherein said optical isolator contains a photo-resistive material which has low resistance in the presence of light, and a lamp, and whereby if all three phases are present, the lamp lgihts, lowers the resistance of the photo-resistant material and said gate means remains in the closed circuit position, and whereby if the input voltage is not applied to one or more phases of the three phase voltage input, the lamp does not turn on and the resistance of the photoresistive material remains very high, and whereby said gate means moves to the open circuit position and no voltage is applied to any of the phases of the inductance.

8. A protective circuit according to claim 1, wherein the circuit means for lowering the input voltage comprises at least one A.C. transformer.

9. A protective circuit according to claim 11, wherein the means for lowering the input voltage comprises a pair of A.C. transformers.

10. A protective circuit according to claim 12, wherein the secondary of said A.C. transformers is connected to an optical isolator.

11. A protective circuit for three phase inductances comprising: voltage reduction means for reducing the voltage of all three phases; dual solid state voltage sensor means connected across all three phases which senses the presence of all three phases of a voltage to be applied to a three phase inductance; circuit means connecting said dual solid state voltage sensor means to gate means which if all three phases are present remains in a first position permitting the voltage to be applied to a three phase inductance; and if all three phases are not present, said gate means moves to an open circuit position preventing application of the voltage to the three phase inductance.

12. A protective circuit according to claim 11 wherein said dual solid state voltage sensor means are used in parallel with the voltage across any two of the phases being applied to one of the voltage sensor means.

13. A protective circuit according to claim 11 wherein said dual solid state voltage sensing means comprise a pair of optical isolators.

14. A protective circuit according to claim 11 wherein the optical isolator contains a photo-resistor material which has low resistance in the presence of light, and a lamp, and whereby if all three phases are present, the lamp lights, lowers the resistance of the photo-resistant material and said gate means remains in the closed circuit position, and whereby if the input voltage is not applied to one or more phases of the three phase voltage input, the lamp does not turn on and the resistance of the photo-resistance material remains very high, and whereby said gate means moves to the open circuit position and no voltage is applied to any of the phases of the inductance.

15. A protective circuit according to claim 11 wherein said gate means are selected from triacs and/or a quadracs.

16. A protective circuit according to claim 15, wherein the solid state voltage sensing means comprises an optical coupler.

17. A protective circuit according to claim 16, wherein the optical coupler comprises a light emitting diode and a transistor.

18. A protective circuit according to claim 15, wherein the optical coupler comprises a light emitting diode and a triac.

19. A protective circuit according to claim 18, including means to protect the gate means from noise spikes.

20. A protective circuit according to claim 19, wherein the means to protect the gate means from noise spikes comprises a capacitance in parallel with said gate means.

21. A protective circuit for three phase inductances comprising: voltage reduction means including at least one zener diode; solid state voltage sensor means which senses the presence of all three phases of a voltage to be applied to a three phase inductance connected to said voltage reduction means; circuit means connecting said voltage sensor means to gate means which if all three phases are present remains in a first position permitting the voltage to be applied to a three phase inductance, and if all three phases are not present said gate means moves to an open circuit position preventing application of the voltage to the three phase inductance.

22. A protective circuit according to claim 21, wherein said circuit means comprise means for rectifying the three phase voltages to D.C. and circuit means for lowering the rectified D.C. voltage.

23. A protective circuit according to claim 1, wherein said circuit means for rectifying comprises at least one bridge rectifier.

* * * * *